United States Patent [19]

Pluss

[11] Patent Number: 4,497,751

[45] Date of Patent: Feb. 5, 1985

[54] ZIG-ZAG PROFILE PACKING AND METHOD OF MAKING

[75] Inventor: Raymond Pluss, Klein Andelfingen, Switzerland

[73] Assignee: Sulzer Brothers Limited, Winterthur, Switzerland

[21] Appl. No.: 398,186

[22] Filed: Jul. 14, 1982

[30] Foreign Application Priority Data

Jul. 30, 1981 [CH] Switzerland .......................... 4924/81

[51] Int. Cl.³ ................................................ B01F 3/04
[52] U.S. Cl. ................................ 261/94; 29/163.5 R; 55/240; 261/112; 261/DIG. 72; 264/285; 366/337; 428/181; 428/597
[58] Field of Search ...................... 261/94–98, 261/108, 112, 113, DIG. 72; 55/90, 233, 240, 241; 210/150; 202/158; 422/310; D23/3, 4; 264/285, 249, 286, 287; 29/157.3 D, 163.5 R; 428/176, 597, 181–185, 604; 165/166, 60; 366/336, 337, 338, 340

[56] References Cited

U.S. PATENT DOCUMENTS 3,013,781 12/1961 Haselden ............................ 261/112
3,346,246 10/1967 Loetel et al. ..................... 261/112 X
3,422,777 1/1969 Plegat ........................ 29/157.3 D X
3,652,066 3/1972 Faigle ............................ 261/112 X
3,785,914 1/1974 King ................................ 428/185 X
4,296,050 10/1981 Meier ........................ 261/DIG. 72

FOREIGN PATENT DOCUMENTS 532764 4/1932 Fed. Rep. of Germany ........ 261/94
2060178 11/1971 Fed. Rep. of Germany ...... 261/112
96662 11/1922 Switzerland ......................... 261/94
843119 8/1960 United Kingdom ................ 261/112
1253307 11/1971 United Kingdom .......... 29/157.3 D Primary Examiner—Richard L. Chiesa
Attorney, Agent, or Firm—Kenyon & Kenyon

[57] ABSTRACT

The packing is made up of layers each of which is deformed into a zig-zag shape. Each layer has contiguous rows of deflecting surfaces which are interconnected by bridges and with every other deflecting surface being stamped out so as to be bent out of the plane of the layer. The stamped out deflecting surfaces of adjacent rows are offset from one another by the width of one deflecting surface and are bent out of so far as to be parallel to the next flank.

13 Claims, 7 Drawing Figures

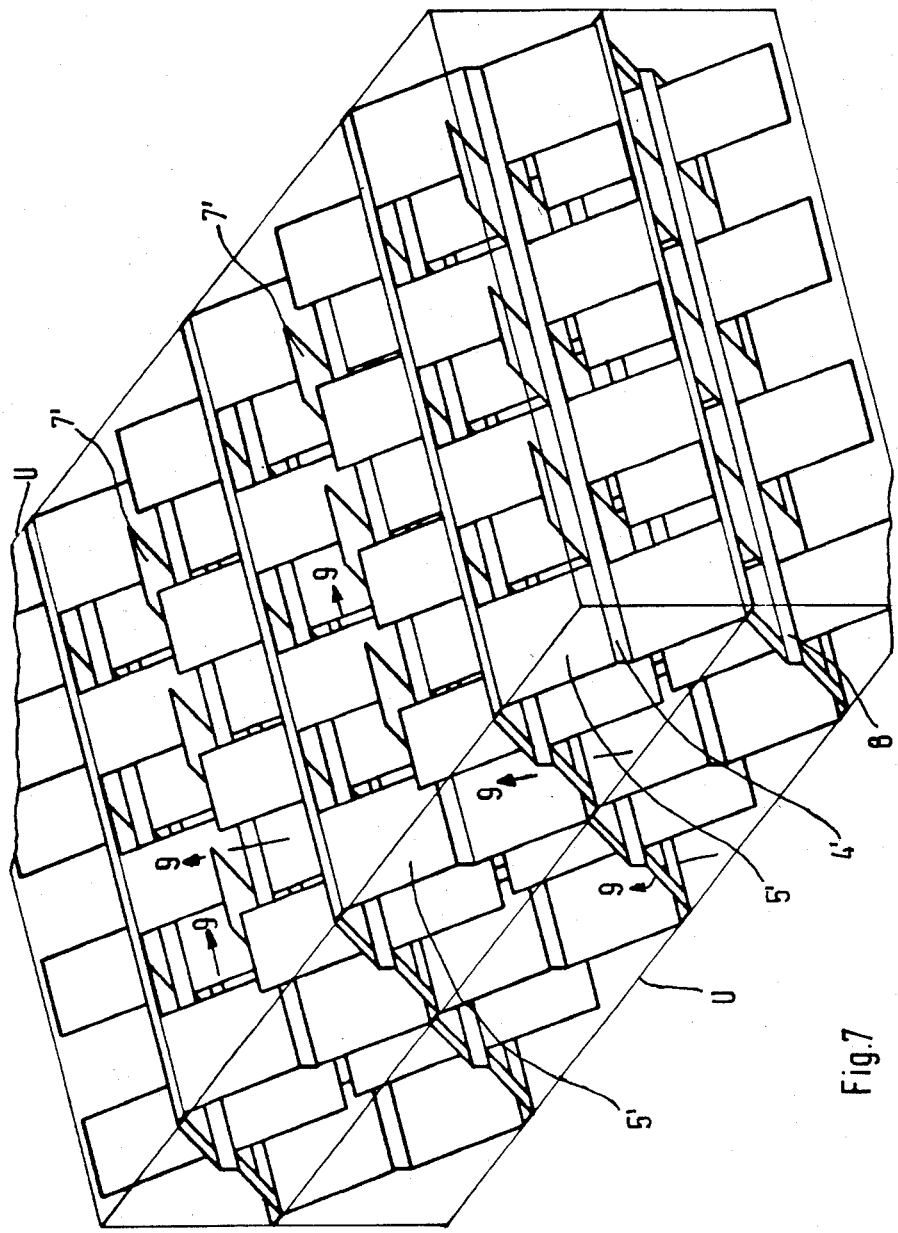

ZIG-ZAG PROFILE PACKING AND METHOD OF MAKING

This invention relates to a packing made of sheet material and a process of making the packing.

Heretofore, various types of packings have been known for use in mass transfer, direct heat exchange and mixing. For example, various types of packings have been used in static mixers such as described in U.S. Pat. Nos. 4,062,524 and 4,220,416. The function of the packings in these mixers is to provide a homogeneous mixing of two or more cocurrent flows, that is, to insure good mixing of the end product over the whole flow cross-section at all quantity and viscosity ratios of the components required to be mixed.

When used in mass transfer processes, particularly, for rectification, the packings are flowed through in countercurrent by the phases concerned in the mass transfer. In this case, the various surfaces of the packings serve as support surfaces for a liquid phase which trickles down as a film under gravity and with which, in the case of a gas-liquid process, a gas phase filling up the various gaps in the packing in counter-current to the liquid phase is brought into surface contact or with which, in the case of extraction columns, a second liquid phase is brought into surface contact.

However, the various packings have been constructed in manners which are very expensive, particularly in view of the wide range of diameters required for such packings. For example, the U.S. Pat. No. 4,062,524 describes packings which are formed of comb-like plates which are pushed together in the shape of a cross. U.S. Pat. No. 4,220,416 describes packings which consist of joined-together discrete elements in the form of "Spanish riders". In each case, the packings require special stamping tools for each diameter.

Accordingly, it is an object of the invention to provide a packing which is simple and inexpensive to produce for any required diameter.

It is another object of the invention to provide a packing element which can be made in a relatively simple manner for use in constructing a packing.

Briefly, the invention provides a packing which is comprised of a plurality of layers which are disposed one over the other with each layer having a zig-zag shaped profile to define a plurality of flank planes. In addition, each layer has a plurality of contiguous transverse rows of deflecting surfaces and a plurality of bridges which connect the rows of deflecting elements to each other.

Each deflecting surface of a respective transverse row of a layer is disposed in angular relation to an adjacent deflecting surface of the row with every other deflecting surface projecting from the flank plane of the row. In this way, the layers define a structure of crossing deflecting surfaces.

Each layer can initially be made of a flat sheet of deformable material. In this case, the sheet is provided with a plurality of transverse rows of spaced apart bendable tabs which define an alternating sequence of integral deflecting surfaces and bendable deflecting elements. The sheet is also formed with a plurality of bridges which interconnect the transverse rows. In this respect, the bridges may be transversely disposed in parallel relation to each other such that each deflecting surface is of rectangular shape.

The tabs are disposed in pairs in longitudinal rows of the sheet with each pair of tabs being disposed in alternating manner with pairs of the integral deflecting surfaces in each longitudinal row.

The layers of the packing are arranged so that each defines a zig-zag profile with a plurality of apices and troughs between the flank planes with the bridges connecting the deflecting surfaces in the flank planes being disposed at the apices and troughs. The bridges which connect the deflecting surfaces which project from the flank planes are disposed centrally of the flanks.

When the various layers are grouped together, the layers bound continuous crossing flow channels.

In one embodiment, the projecting deflecting surfaces are made shorter than the deflecting surfaces in the flank planes; while in another embodiment, the projecting deflecting surfaces are of equal length to the deflecting surfaces in the flank planes. In this latter case, the projecting deflecting surfaces have recessed ends which correspond to the bridges between the deflecting surfaces in the flank planes.

In accordance with the invention, the process for making the packing comprises the initial step of forming a flat sheet with a plurality of transverse rows of spaced apart tabs in order to define an alternating sequence of integral deflecting surfaces and bendable deflecting surfaces. Thereafter, the sheet is deformed in order to form a zig-zag profile having a plurality of flank planes with two adjacent rows of the deflecting surfaces disposed in a respective flank plane and each tab of each row is bent outwardly of the respective flank plane into parallel relation to an adjacent flank plane.

Where the material is a thermoplastic or a thermo-setting material, the layers may be formed by injection molding or pressure molding.

These and other objects and advantages of the invention will become more apparent from the following detailed description taken in conjunction with the accompanying drawings wherein:

FIG. 7 illustrates a perspective view of a packing embodied by two layers disposed one above the other in accordance with the invention.

Figures 1, 2:
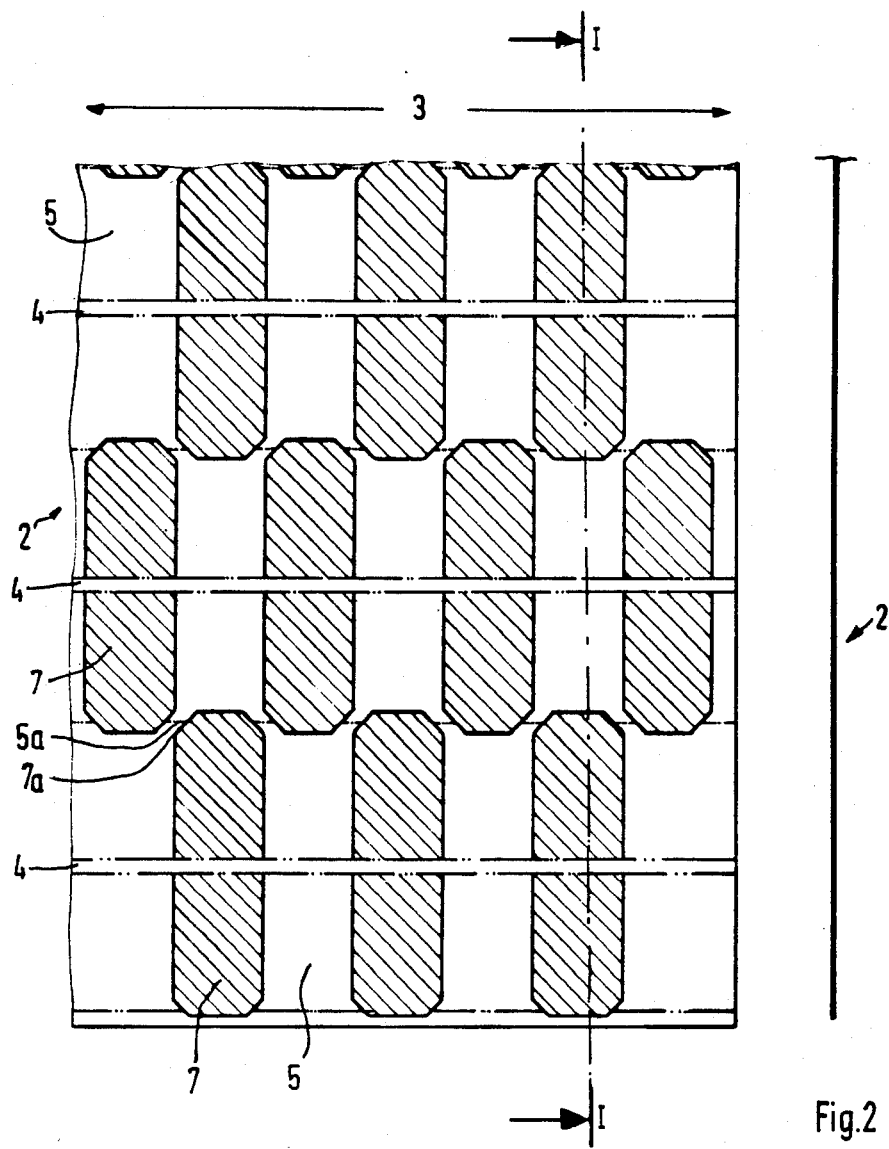
FIG. 1 illustrates a plan view of a part of a stamped flat sheet for forming a packing in accordance with the invention.
FIG. 2 illustrates a view taken on line I—I of FIG. 1.

Referring to FIGS. 1 and 2, a layer 2 for a packing is initially formed of a flat sheet of foil-like material, for example sheet metal. The layer 2 is provided, for example by stamping with a plurality of transverse rows 3 of spaced apart bendable tabs 7 and a plurality of bridges 4 which interconnect the transverse rows 3. The tabs 7 define bendable deflecting surfaces which alternate with integral deflecting surfaces 5 in each transverse row.

As indicated, the tabs 7 are disposed in pairs in longitudinal rows of the layer 2 in alternating manner with pairs of the integral deflecting surfaces 5.

The bridges 4 are disposed in parallel to separate the rows 3 of deflecting surfaces.

In addition, the tabs 7 have recessed ends 7a which correspond to bridges 5a which are angularly disposed between every other row of deflecting surfaces.

Figures 3, 4:
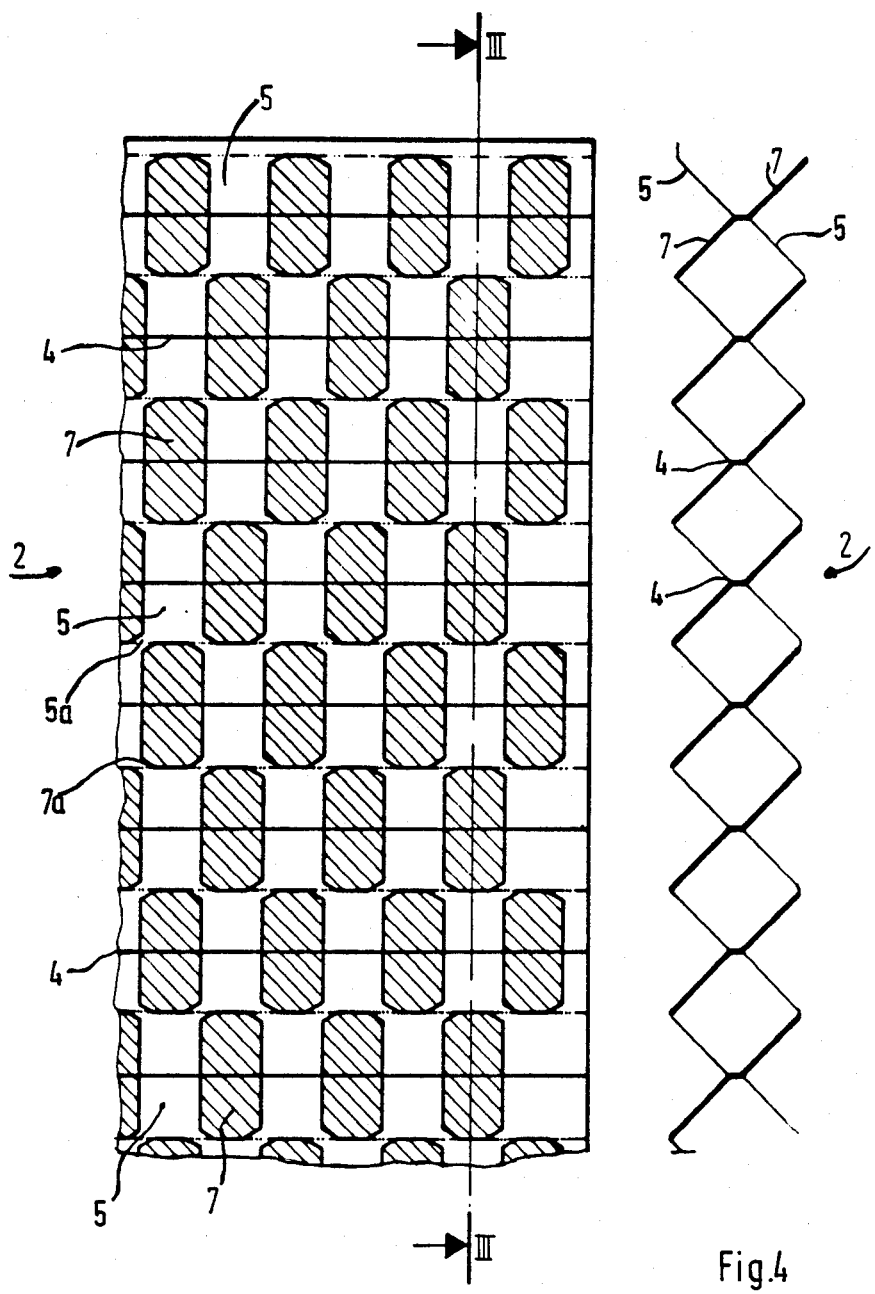
FIG. 3 illustrates a plan view of a deformed sheet in accordance with the invention.
FIG. 4 illustrates a view taken on line III—III of FIG. 3.

Referring to FIGS. 3 and 4, the flat layer 2 is deformed into a zig-zag shaped profile (as shown in FIG. 4) having a plurality of flank planes with two adjacent rows 3 being disposed in a respective flank plane. In addition, the zig-zag profile defines a plurality of apices and troughs between the flank planes. In addition, each tab 7 is bent from each respective row outwardly of the respective flank plane into parallel relation to an adjacent flank plane. For example, as indicated at the top of FIG. 4, one flank plane is formed by two consecutive integral deflecting surfaces 5 of one longitudinal row whereas the two tabs 7 of the next adjacent row are bent out of the flank plane.

The bridges 5a which connect the deflecting surfaces in the flank planes are disposed at the apices and troughs while the bridges 4 which connect the tabs 7 are disposed centrally of the flanks.

More specifically, in order to form the zig-zag profile, the flat sheet of FIG. 1 is bent along the bridges 5a to form a corrugated shape. In this case, the bridges 4 are located centrally of each flank plane of the corrugated shape, i.e. half way along the sidewall of a corrugation as indicated in FIG. 4 and the tabs 7 are bent relative to the bridges 4 so as to extend in generally perpendicular relation to the sidewalls of the corrugations.

If required, the stamped out tabs 7 can be bent out of the flank planes of the zig-zag troughs and apices by an angle other than a right angle.

Figures 5, 6:
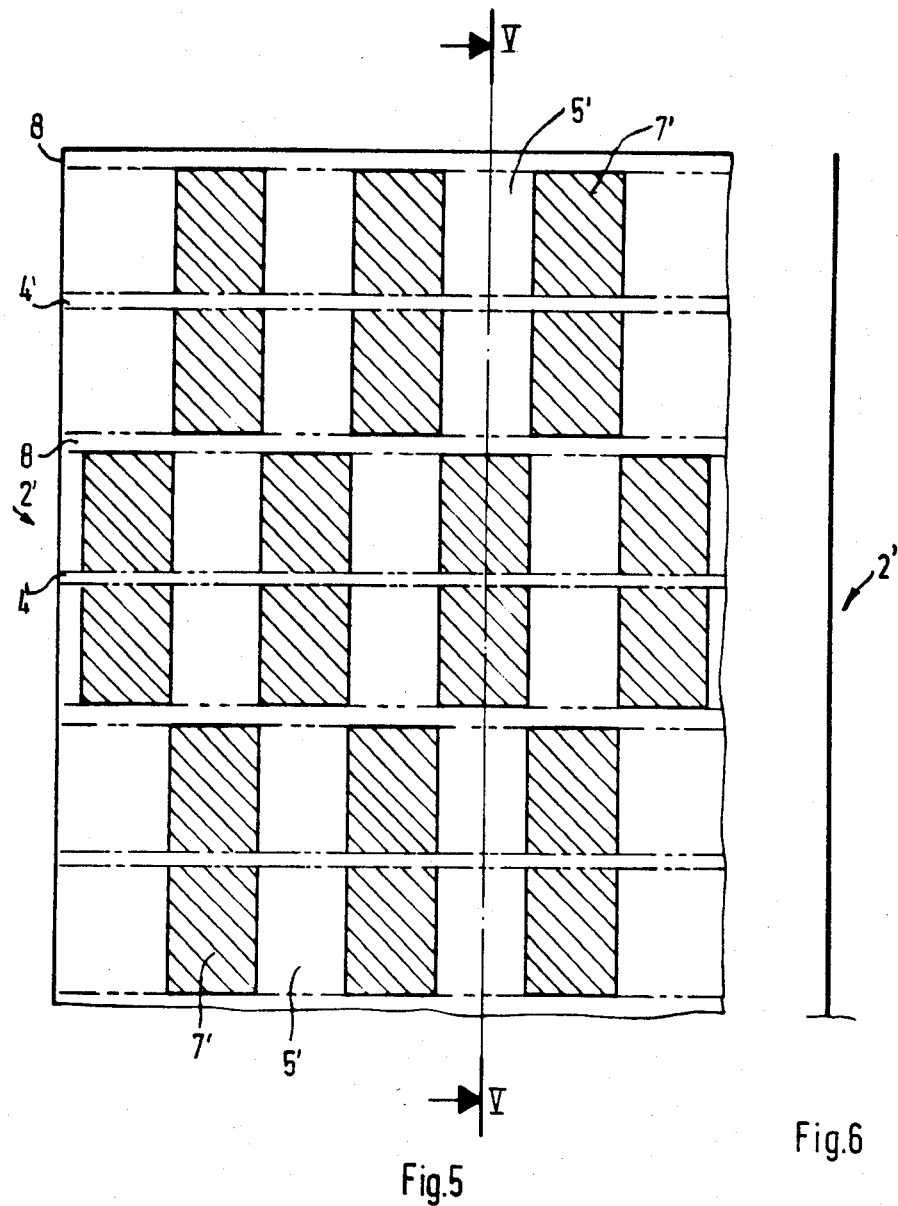
FIG. 5 illustrates a plan view of a part of a modified sheet for forming a packing in accordance with the invention.
FIG. 6 illustrates a view taken on line V—V of FIG. 5.

Referring to FIG. 5, each layer 2' for a packing may be stamped out with deflecting surfaces 5', 7' which have the same rectangular shape. In this case, the ends of the integral deflecting surfaces 5' of adjacent rows are interconnected by connecting bridges 8 which are also parallel to the bridges 4'.

The layer 2' can be shaped into a zig-zag profile by bending along the connecting bridges 4' and 8'.

Referring to FIG. 7, a packing having a contour as defined by the lines U is comprised of two layers 2 each of which is made as indicated in FIG. 5. The layers 2 are so disposed one on another than the stamped out deflecting surfaces 7', 5' in the flank planes are each disposed in one direction so that crossing continuous flow channels 9 arise between the surfaces 7' and the surfaces 5' of the superjacent layer 2.

Of note, the packing can comprise a number of groups of layers which are arranged in adjacent relation to each other in segment-fashion. The packing may also be made of two or more layers 2 which are disposed one above the other. Further, the contour of the packing, that is of the discrete layers, can be adapted to the inner periphery of the column or housing within which the packing is placed.

Alternatively, at least one layer can be placed on an adjacent layer so that the flow channels have a change of direction between the two layers. In this event, the layers are brought into the appropriate position, for example, by being moved relative to one another or turned through a semicircle.

The invention thus provides a packing which can be made from flat sheets of material in a relatively simple and inexpensive manner. Further, the openness of the structure provides various flow channels for the lateral mixing of media flowing in cocurrent relation or can provide for the lateral mixing and distribution of media which are flowing in countercurrent relation through the packing. For example, where the packing is made of plastics, the packing can be produced by injection molding.

What is claimed is:

1. A packing comprising a plurality of layers disposed one over the other, each said layer having a zig-zag shaped profile to define a plurality of flank planes with a plurality of contiguous transverse rows of pairs of deflecting surfaces and a plurality of bridges connecting said rows of deflecting elements to each other, each said deflecting surface of a respective row being disposed in angular relation to an adjacent deflecting surface of said row with every other deflecting surface of a row projecting from said flank planes in parallel relation to the adjacent flank plane whereby said layers define a structure of crossing deflecting surfaces.

2. A packing as set forth in claim 1 wherein said zig-zag profile defines a plurality of apices and troughs between said flank planes with said bridges connecting said deflecting surfaces in said flank planes being disposed at said apices and troughs and said bridges connecting said deflecting surfaces projecting from said flank planes being disposed centrally of the flank planes.

3. A packing as set forth in claim 1 wherein at least two layers are disposed relative to each other to bound continuous crossing flow channels.

4. A packing as set forth in claim 1 wherein at least two layers are disposed relative to each other to define flow channels which change direction from layer to layer.

5. A packing as set forth in claim 1 wherein said projecting deflecting surfaces are shorter than said deflecting surfaces in said flank planes.

6. A packing as set forth in claim 1 wherein said projecting deflecting surfaces are of equal length to said deflecting surfaces in said flank planes and have recessed ends corresponding to said bridges between said deflecting surfaces in said flank planes.

7. A layer made of deformable material having a plurality of transverse rows of spaced apart bendable tabs defining an alternating sequence of integral deflecting surfaces and bendable deflecting surfaces and a plurality of bridges interconnecting said tabs in said transverse rows, said tabs being disposed in pairs in longitudinal rows of said sheet with said pairs of tabs being disposed in alternating manner with pairs of integral deflecting surfaces in said longitudinal rows.

8. A layer as set forth in claim 7 wherein said bridges are transversely disposed in parallel relation to each other and each said deflecting surface is of rectangular shape.

9. A layer as set forth in claim 7 wherein each said tab is integral at only one end with a respective bridge.

10. A layer as set forth in claim 7 of sheet metal.

11. A layer as set forth in claim 7 wherein said integral deflecting surfaces in each transverse row are bendable about said bridges and said tabs of each said transverse row are bendable about said bridges in an opposite angular manner.

12. A layer having a zig-zag shaped profile to define a plurality of flank planes with a plurality of contiguous transverse rows of pairs of deflecting surfaces and a plurality of bridges connecting said rows of deflecting elements to each other, each said deflecting surface of a respective row being disposed in angular relation to an adjacent deflecting surface of said row with every other deflecting surface of a row projecting from said flank planes in parallel relation to the adjacent flank plane.

13. A process for making a regular packing comprising the steps of forming a flat sheet with a plurality of transverse rows of spaced apart tabs to define an alternating sequence of integral deflecting surfaces and bendable deflecting surfaces;

deforming the flat sheet to form a zig-zag shaped profile having a plurality of flank planes with two adjacent rows of said surfaces being disposed in a respective flank plane; and bending each tab of each row outwardly of said respective flank plane into parallel relation to an adjacent flank plane.

* * * * *

UNITED STATES PATENT AND TRADEMARK OFFICE
CERTIFICATE OF CORRECTION

PATENT NO. : 4,497,751

DATED : February 5, 1985

INVENTOR(S) : Raymond Pluss

It is certified that error appears in the above-identified patent and that said Letters Patent is hereby corrected as shown below:

Column 1, line 5 after "packing" insert --for mass transfer, direct heat exchange and mixing--

Column 1, after line 33 before "Where" insert the following --In the case where the sheet is made of sheet metal, the tabs can be stamped.--

Signed and Sealed this

Twenty-eighth Day of May 1985

[SEAL]

Attest:

DONALD J. QUIGG

Attesting Officer

Acting Commissioner of Patents and Trademarks